INVENTOR.
ROBERT E. DALEY
BY
Brown, Critchlow, Flick & Peckham
ATTORNEYS.

May 26, 1970 R. E. DALEY 3,514,069
APPARATUS FOR MOLDING INGOTS
Filed Sept. 12, 1966 3 Sheets-Sheet 2

INVENTOR.
ROBERT E. DALEY
BY
Brown, Critchlow, Flick & Peckham
ATTORNEYS.

United States Patent Office 3,514,069
Patented May 26, 1970

3,514,069
APPARATUS FOR MOLDING INGOTS
Robert E. Daley, 1465 NW. 203rd St.,
Miami, Fla. 33169
Filed Sept. 12, 1966, Ser. No. 578,648
Int. Cl. B22d *15/00*
U.S. Cl. 249—111                                        1 Claim

ABSTRACT OF THE DISCLOSURE

Ingot molding apparatus for pipeless ingots is provided with an open-top molding cavity that has a lower end portion and an upwardly tapered upper portion. A band of thermal insulation engages the side wall of the cavity at the bottom of its upper portion to delay solidification of the molten metal surrounded by the band until the major portion of the ingot above has solidified.

---

One way of molding ingots in a steel mill is to pour the molten metal into a mold that has a molding cavity in it open at both top and bottom. The mold rests on a stool that forms the bottom of the cavity. The molding cavity tapers upwardly so that an ingot molded therein will have its big end down. A hot top is mounted on the mold to maintain a reservoir of molten metal that will fill the shrinkage cavity that otherwise will form during solidification of the upper part of the ingot. Since solidifying of the hot metal is controlled mainly by the cross sectional dimensions of the mold, the metal poured into a big end down mold will solidify first at the top where the cross section is smallest and then progressively downward. However, the present practice of using a heavy cast iron stool to support the mold helps to dissipate the heat from the molten metal in the bottom of the mold, so that the very bottom of the ingot solidifies before the interior. This produces a secondary pipe inside the lower part of the ingot, which is undesirable for high grade steel. Furthermore, the portion of the ingot that extends up into the hot top has to be cropped and therefore is not converted into product, but is scrapped.

Actually, most ingots are formed in big end up molds where secondary pipe ordinarily does not occur. Nevertheless, all the disadvantages resulting from the necessity of using hot tops with such molds are present, plus the further disadvantage that the hot tops usually are bigger than with big end down molds, so that more metal is required for filling a hot top and ends up as scrap.

It is among the objects of this invention to provide a method and apparatus for molding ingots, which will efficiently and economically produce high quality ingots, which does not require the use of hot tops or equivalent mold extensions, which permits more rapid pouring of ingots, and which eliminates all pipe or shrinkage cavities in the ingots.

In accordance with this invention, mold means are provided with an open-top molding cavity having a lower end portion and an upwardly tapered upper portion. Engaging the side wall of the mold means at the bottom of the upwardly tapered portion of the molding cavity there is a band of thermal insulation, either passive refractory material or active exothermic material. This insulation delays solidification of the portion of the molten ingot surrounded by it until after the major portion of the ingot above it has solidified. By materially reducing the width of the top part of the molding cavity, cooling of the top part of the ingot can be accelerated. The weight of the solidifying and contracting upper portion of the ingot presses down on the molten metal below it and prevents any pipe from forming in the ingot by forcing molten metal up into any cavities that start to form as the metal shrinks.

The invention is illustrated in the accompanying drawings, in which.

Figure 1:
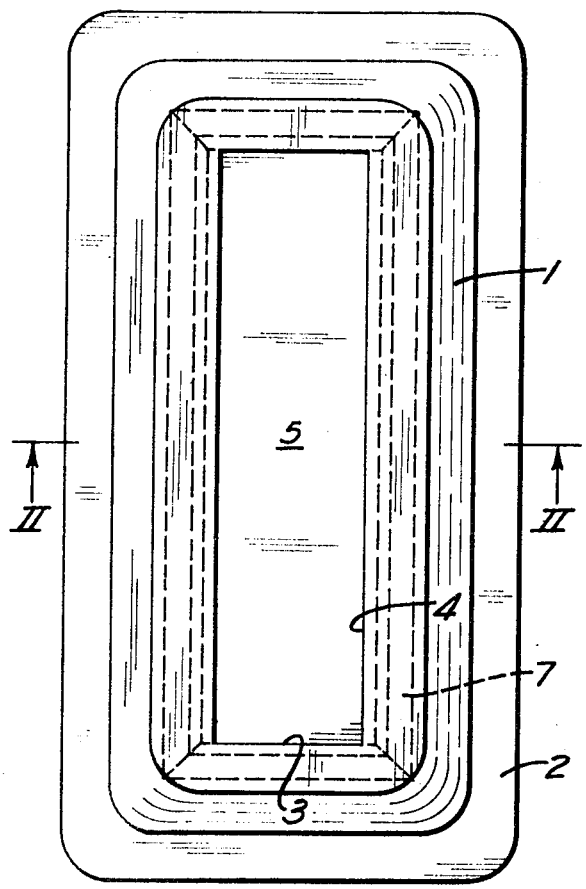
FIG. 1 is a plan view of my ingot molding apparatus.
Figure 2:
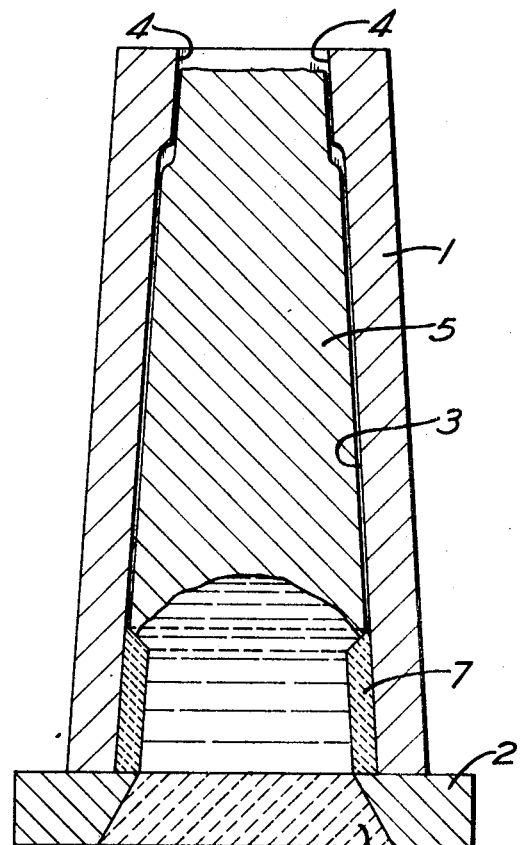
FIG. 2 is a vertical cross section taken on the line II–II of FIG. 1.

Referring to FIGS. 1 and 2 of the drawings, a mold 1 for big end down ingots is supported by a flat stool 2. Generally, the entire mold will taper upwardly, but in any event the molding cavity 3 inside of it is tapered. The entire molding cavity is located inside the mold, while the stool closes the bottom of the cavity. The two opposite side walls 4 of the top part of the cavity, which may be about a foot deep, are offset inwardly toward each other in order to reduce the width of this part of the cavity. The reason for this is to reduce the transverse thickness of the top part of the ingot 5 in the mold so that cooling and solidifying of that part will be accelerated. The amount that the top of the molding cavity should be reduced in width, and the depth of the reduced upper end portion of the cavity, can be determined for any given size and shape of mold by experiment, but in general the proper conditions will be produced if the width of the top of the cavity is approximately one-third the width of the bottom of the cavity.

The lower end portion of the molding cavity is lined for a height of several inches from the bottom by a liner or band 7 of thermal insulation that engages the side wall of the cavity. This insulating band rests on the stool and may be formed from strips of refractory insulating material or exothermic material or a combination of them. In this first embodiment of the invention the band is shown with a uniform wall thickness. The most suitable height and thickness for any particular band of insulation can quickly be determined by experiment. The purpose of the band is to retard cooling and thereby delay solidifying of the lower portion of the molten ingot metal until after the major portion of the ingot above it has solidified. In other words, the band of insulation retards conduction of heat from the ingot to the metal walls of the mold. Cooling of the very bottom of the ingot can be retarded by providing the cast iron stool with a large central opening extending substantially the full length of the molding cavity and filled with a refractory insert 8. This insert also has the advantage of being easily replaceable, which is desirable because it is the central portion of the stool that receives the most abuse, due to pouring of the molten steel directly onto it as the mold is being filled. With the refractory insert, the cast iron stool can be used much longer than otherwise would be the case because worn inserts can be replaced.

Since with the apparatus disclosed herein the ingot metal in the bottom part of the mold is maintained in a molten or mushy state until after the upper part of the ingot has solidified and shrunken away from the adjoining tapered walls of the mold cavity, the entire weight of the solidified part of the ingot and the mushy steel in it will press down on the underlying unsolidified steel near the bottom of the ingot and thereby prevent any shrinkage cavities or pipe from forming in it as it cools. Thus, if any shrinkage cavity attempts to form in the lower end of the portion of the ingot above the insulation, due to cooling of the metal, it will immediately be filled by the molten metal below it. Consequently, the ingot will be sound throughout, thereby affording exceptionally high yield.

Figure 3:
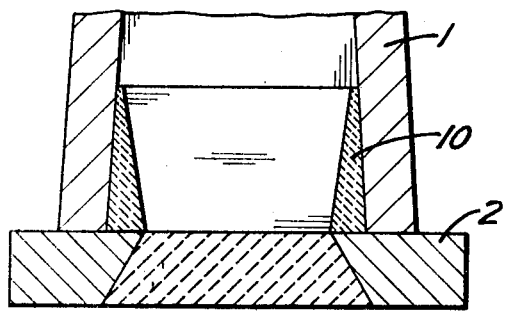
FIGS. 3, 4 and 5 are fragmentary vertical cross sections of three different modifications.

The cross section of the wall of the insulation band can take various forms. One suitable variation is shown in FIG. 3 where it will be seen that the wall of the band 10 tapers upwardly. This band therefore provides progressively more insulation as the bottom of the molding cavity is approached, which is the place where it is desired that solidification of the metal occur last.

Figure 4:
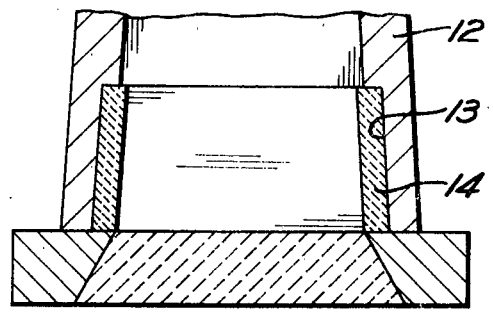

In the modification shown in FIG. 4, the lower end portion of the inside of the mold 12 is provided with a recess 13, in which the insulation band 14 or liner is located. This construction has the advantage of positively preventing any floating up of the insulation band as the ingot is being poured.

Figure 5:
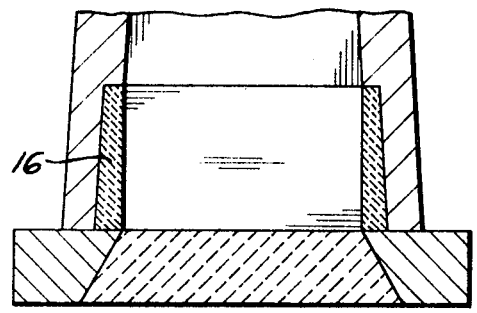

The further embodiment of the invention illustrated in FIG. 5 shows that the recessed insulation band 16 also can take other forms, preferably having a side wall that is thicker at its bottom than at its top, similar to the one in FIG. 3.

Figure 6:
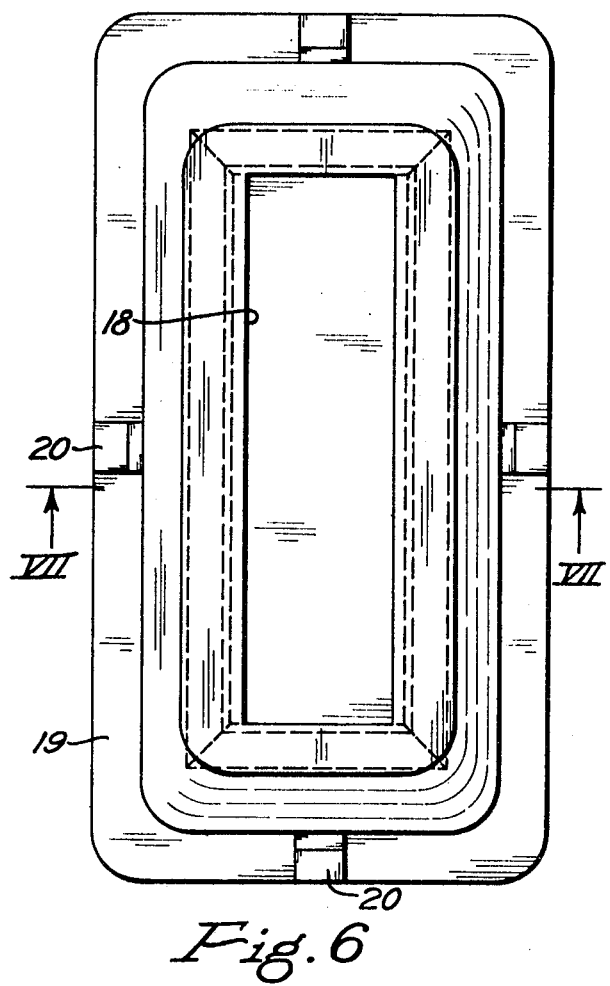
FIG. 6 is a plan view of a further embodiment of the invention.
Figure 7:
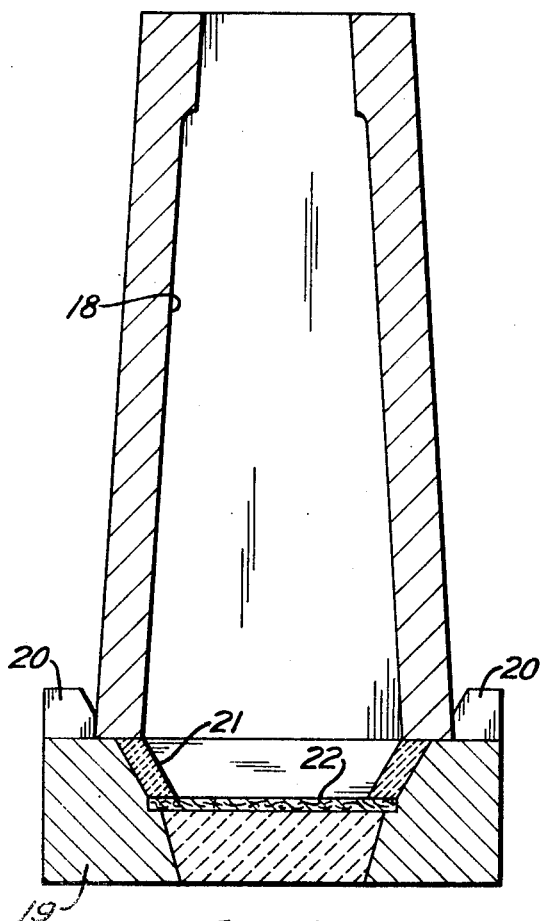
FIG. 7 is a vertical cross section of FIG. 6 taken on the line VII–VII thereof.

The embodiment of the invention shown in FIGS. 6 and 7 has the advantages that the insulation band is easier to put in position and will be automatically locked against floating up into the ingot. In this construction, the lower end portion of the molding cavity 18 is located in the stool 19 itself, rather than in the lower part of the mold. The cavity in the stool preferably tapers downwardly and its upper end most suitably is larger than the bottom of the cavity in the mold, but smaller than the bottom of the mold itself so that the mold can rest on the stool around the stool cavity and extend a short distance inwardly over it. The mold may be centered on the stool by means of integral bosses 20 projecting from the top of the stool outside of the mold. The cavity in the stool is lined with a band 21 of thermal insulation, the inner surface of which preferably tapers downwardly. It will be seen that this insulating band can be quickly dropped into the stool cavity without inverting the mold and before the mold is set down on the stool. To help protect the bottom of the stool cavity from erosion by the steel being poured into it, a pad 22 of steel, paper pulp, wood, refractory or other material or any combination thereof may be placed in the bottom of the cavity before the insulation band is set in place. The pad and band are locked in the cavity by the overlying portion of the mold.

Figure 8:
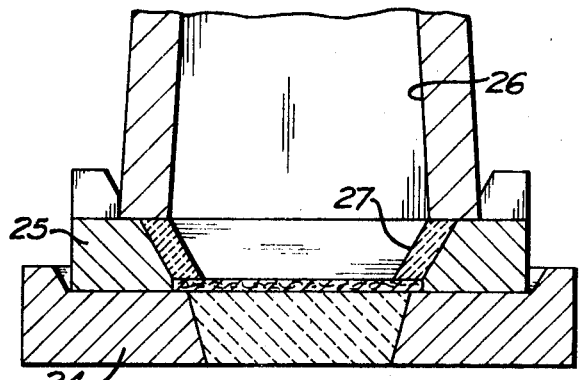
FIG. 8 is a fragmentary vertical cross section of a still further modification.

The construction shown in FIG. 8 is essentially the same as that in FIG. 7, except that the cast iron portion of the stool is made in two parts. One of these parts forms a base 24 on which rests the other part, in the form of a ring 25. A large opening in the ring forms the lower end portion of the molding cavity 26 and receives the lining 27 of insulation to retard cooling of the lower portion of the ingot.

In the modifications shown in FIGS. 9 to 12, the member that supports the member containing the upwardly tapered molding cavity is not so much a stool as a lower section of the mold itself. Thus, in FIG. 9 the upper section 30 of the mold contains the upwardly tapered molding cavity 31 and fits over and rests on a lower mold section 32 which contains a downwardly tapered deep lower end portion 33 of the cavity. The upper part of the cavity in the lower mold section is provided with an offset, in which a band 34 of thermal insulation is disposed. This insulation will keep the ingot metal that it surrounds in molten or mushy condition until after the major portion of the ingot above has solidified. Any shrinkage cavities that otherwise might form in the ingot metal below the insulation are prevented by the molten metal above them from forming because they would be filled immediately by that metal. Also, the metal bearing down on the molten metal prevents any shrinkage cavities from forming in that zone as it cools.

Figure 9:
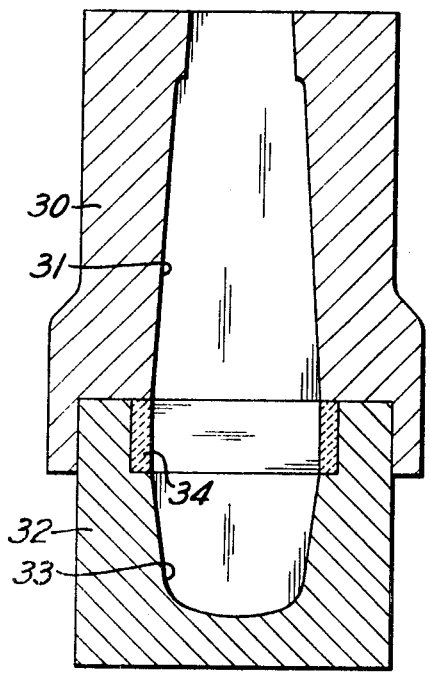
FIGS. 9 to 12 are vertical cross sections of four more modifications of the invention.
Figure 10:
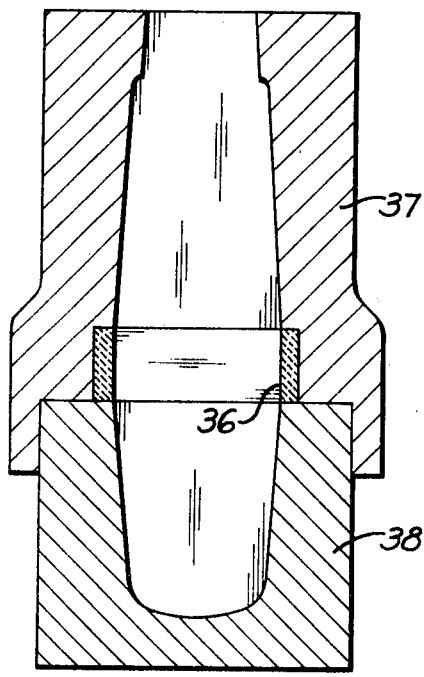

The only difference between FIG. 10 and FIG. 9 is that in FIG. 10 the offset in the molding cavity for receiving the band 36 of insulation is in the lower end of the upwardly tapered cavity in the upper mold section 37, which rests on the lower mold section 38.

Figure 11:
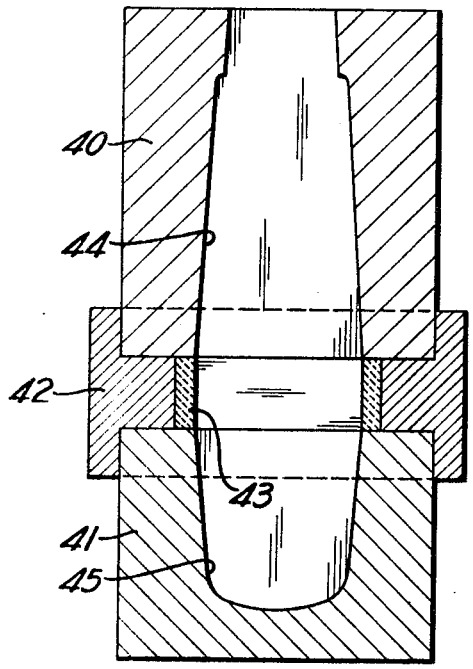

In FIG. 11 the upper and lower mold sections 40 and 41 are spaced apart by a short intermediate section 42 that also holds the other sections in alignment. The inner diameter of this intermediate section is somewhat greater than the major diameter of the molding cavity. The inner wall of the intermediate section is substantially vertical, and a band 43 of insulation is disposed in the recess formed by the intermediate section. The molding cavity 44 above this section tapers upwardly, while the cavity 45 below it tapers downwardly.

Figure 12:
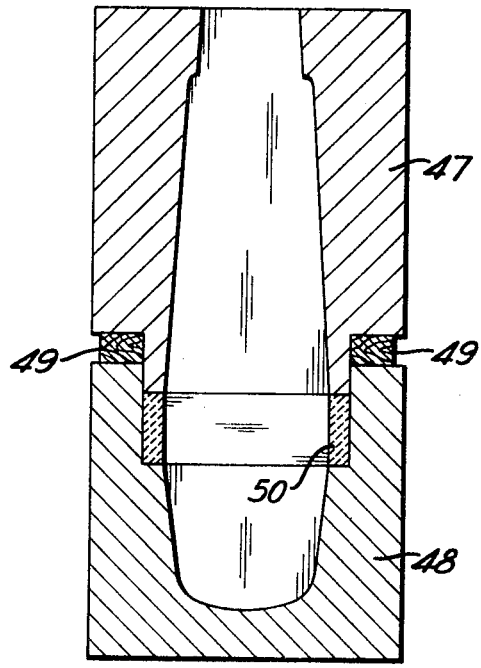

The embodiment of the invention shown in FIG. 12 is similar to the one illustrated in FIG. 9, but instead of the upper mold section 47 resting directly on the lower mold section 48 it rests on heat consumable blocks 49, such as blocks of wood, fiber, composition, etc., and the lower end of the upper mold section is telescoped into the offset upper end of the cavity in the lower mold section above the band 50 of thermal insulation. This apparatus operates in the same way as the one shown in FIG. 9, but in addition the burning out of the blocks, due to the heat of the molten metal in the mold, permits the upper mold section to descend and add its weight and pressure to that of the solidified upwardly tapered portion of the ingot to prevent shrinkage cavities from forming in the lower part of the ingot as it cools. One does not need to wait for the blocks to burn out, however, because they could be knocked out after pouring. If it is desired to knock out the blocks, then of course they would not need to be heat consumable.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Ingot molding apparatus for making big end down ingots, comprising a top fill metal mold provided with an upwardly tapered molding cavity open at top and bottom and having a flat lower end, a metal stool having a flat top supporting the mold, the stool being provided with a downwardly tapered recess extending only part way down through it and forming a continuation of said cavity, the flat lower end of the mold resting on the flat top of the stool around the top of said recess and projecting inwardly over the recess, the stool being provided with upwardly projecting means holding the mold against lateral movement on the stool, and a band of thermal insulation in said recess covering its side wall completely and engaging the overlying flat lower end of the mold.

(References on following page)

References Cited

UNITED STATES PATENTS

| | | | |
|---|---|---|---|
| 1,881,088 | 10/1932 | Matuschka | 249—160 |
| 1,719,544 | 7/1929 | Gathmann | 164—9 |
| 2,472,071 | 6/1949 | Gathmann | 249—111 |
| 669,952 | 3/1901 | Brinton | 249—111 |
| 315,741 | 4/1885 | Henderson | 164—120 |
| 2,340,493 | 2/1944 | Scully et al. | 164—125 |
| 1,073,988 | 9/1913 | Hoyle et al. | 164—125 |
| 444,381 | 1/1891 | Hinsdale | 164—125 |
| 2,509,618 | 5/1950 | Tigerschiold | 249—174 X |
| 2,190,393 | 2/1940 | Belding | 164—127 |
| 2,054,597 | 9/1936 | Gathmann. | |

FOREIGN PATENTS

| | | |
|---|---|---|
| 12,141 | 5/1902 | Great Britain |
| 288,440 | 11/1915 | Germany. |
| 718,848 | 11/1931 | France. |
| 20,383 | 8/1893 | Great Britain. |
| 602,060 | 8/1934 | Germany. |
| 139,441 | 12/1960 | U.S.S.R. |

J. SPENCER OVERHOLSER, Primary Examiner

V. K. RISING, Assistant Examiner

U.S. Cl. X.R.

249—174